United States Patent
Hashimoto et al.

[11] 4,020,467
[45] Apr. 26, 1977

[54] MINIATURIZED KEY ENTRY AND TRANSLATION CIRCUITRY ARRANGEMENT FOR A DATA PROCESSING UNIT

[75] Inventors: Shintaro Hashimoto; Tosaku Nakanishi, both of Nara, Japan

[73] Assignee: Sharp Kabushiki Kaisha, Osaka, Japan

[22] Filed: Sept. 27, 1974

[21] Appl. No.: 509,951

[30] Foreign Application Priority Data

| Sept. 28, 1973 | Japan | 48-109743 |
| Oct. 9, 1973 | Japan | 48-113661 |
| Nov. 19, 1973 | Japan | 48-130513 |

[52] U.S. Cl. .................... 340/172.5; 340/365 S
[51] Int. Cl.[2] ........................................ G06F 3/02
[58] Field of Search ........ 340/172.5, 365 S, 365 R; 235/156

[56] References Cited
UNITED STATES PATENTS

| 3,427,593 | 2/1969 | Wells et al. | 340/172.5 |
| 3,769,621 | 10/1973 | Osborne | 340/172.5 |
| 3,781,874 | 12/1973 | Jennings | 340/365 S |
| 3,892,957 | 7/1975 | Bryant | 340/172.5 X |

*Primary Examiner*—Melvin B. Chapnick
*Attorney, Agent, or Firm*—Birch, Stewart, Kolasch & Birch

[57] ABSTRACT

A key entry and translation system useful with data processing units such as electronic calculators for the purpose of entering desired input information from a keyboard in a predetermined code notation into the data processing units. The present system is of a type wherein the input information from the keyboard is sensed and manipulated in an arithmetic circuit contained within a central processor unit (CPU) in response to program instructions stored in a read-only memory (ROM) and then is entered into the data processing unit through an input buffer contained within a random access memory (RAM). Pursuant to the present system, key entries may be registered during arithmetic operations or printing procedures, through the use of a CPU. Furthermore, the present system is adapted to determine whether the input information from the keyboard is either present or absent before interrogation as to the contents of the input information, for the purpose of speeding up arithmetic operations. Utilization of an address selection circuit contained within a RAM for generating key strobe or timeshared interrogate signals provides a considerable reduction in a large scale integrated circuit (LSI) which incorporates the above discussed components on a single semiconductor chip.

8 Claims, 6 Drawing Figures

MINIATURIZED KEY ENTRY AND TRANSLATION CIRCUITRY ARRANGEMENT FOR A DATA PROCESSING UNIT

BACKGROUND OF THE INVENTION

The present invention relates to a key entry and translation arrangement useful for small size data processing units such as electronic desk-top calculators, electronic cash registers, point of sales units, etc.

In placing input information from a keyboard into one of arithmetic registers, according to the prior art approach, the respective keys of the keyboard are supplied with corresponding key stroke signals or time-shared key interrogate signals and key signals originated in response to depressions of desired keys are processed and translated into unique code signals in a key input circuit which is clearly distinct from a central processor unit (CPU). Then, the thus obtained code signals representative of the selected keys enter into the CPU through an input buffer. This approach is well know in the calculator art as disclosed in greater detail in U.S. Pat. No. 3,715,746, for example.

There are problems associated with the above discussed technique, however, which can not provide a substantial reduction in the chip size of a large scale integrated circuit (LSI) for the reason that the key input circuit set forth above needs a large number of circuit components.

OBJECTS AND SUMMARY OF THE INVENTION

An object of the present invention, therefore, is the provision of a system which utilizes an arithmetic circuit contained within a central processor unit (CPU) to process selected and entered input information without using the conventional key input circuit and accordingly results in a considerable reduction in size of an integrated circuit.

Another object of the present invention is the provision of a system which utilizes an input buffer provided in a random access memory (RAM) also containing the desired number of arithmetic registers thereby to enable key entries in the course of arithmetic operations and printing procedures.

Still another object of the present invention is the provision of a system which is adapted to determine whether succeeding input information is either present or absent before interrogation as to the contents of the input information, for the purpose of expediting arithmetic operations in the absence of the succeeding input information.

A further object of the present invention is the provision of a system which utilizes an address selection circuit necessarily provided in a RAM to issue key stroke signals or time-shared key interrogate signals and accordingly results in a further reduction in chip size of an integrated circuit by virtue of multiplexed utilization of circuit components.

These and other objects and novel features of the present invention are set forth in the appended claims and the present invention as to its organization and its mode of operation will best be understood from a consideration of the following detailed description of the preferred embodiments when used in connection with the accompanying drawings.

DESCRIPTION OF THE PREFERRED EMBODIMENTS

Figure 1:
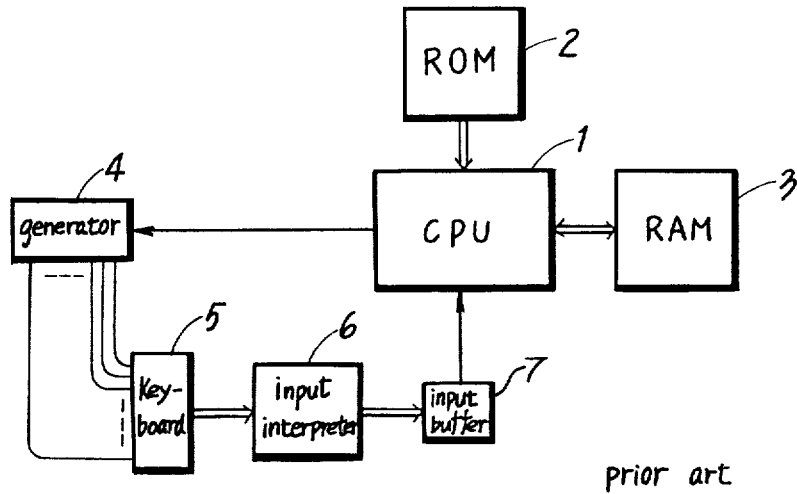
FIG. 1 is a schematic block diagram showing a layout of the prior art key entry technique.

Before discussing the key entry and translation technique in accordance with the present invention in greater detail, it may be of advantage to explain briefly the generic concept of the prior art arrangement with reference to FIG. 1.

As illustrated in FIG. 1, generation of key stroke signals or time-shared key interrogate signals is derived from a generator 4 under control of a central processor unit (CPU) 1, the respective key stroke signals being supplied to each key switch installed on a keyboard unit 5. A certain key signal Ti originated in response to a depression of a desired key is introduced into an input interpreter 6 which translates the key signal Ti on a time-shared interrogation basis into a unique code signal constituting a representation of identity of the selected key. The resulting code signal is temporarily stored in an input buffer 7.

If an arithmetic operation by CPU 1 has been completed, then the input information is copied from the input buffer 7 to CPU 1. The succeeding arithmetic operation will be carried out on the input information transmitted to CPU 1. A read-only memory (ROM) 2 stores a string of program instructions which governs CPU 1. A random access memory (RAM) 3 contains various registers. As set forth previously, in the prior art, difficulties have been encountered in arriving at a one-chip LSI implementation having small size since the generator 4 and the input interpreter 6 contain a large number of circuit components.

The present invention is based upon an improvement wherein multiplexed utilization of the existing circuit components provides a considerable reduction in chip size of LSI implementation and an increase in operation speed. More specifically, an arithmetic operation circuit system contained within CPU is utilized together with an address selection circuit to perform a key entry mode instead of the generator 4 and the input interpreter 6 used in the past.

Figure 2:
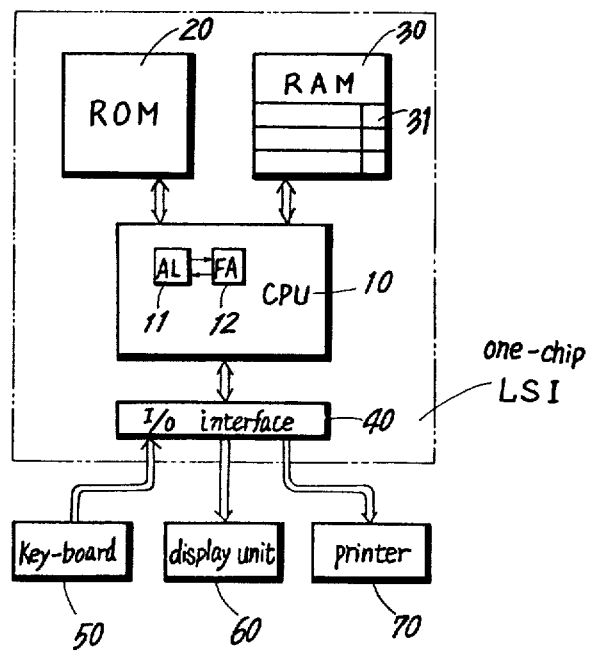
FIG. 2 is a schematic block diagram showing a concept of a key entry circuit system embodying the present invention.

Referring now to FIG. 2 illustrating the constitutional and operational concept of the key entry and translation system embodying the present invention, input information derived from a keyboard 50 is introduced via an I/O interface 40 into the interior of CPU 10 wherein the thus introduced input information is interrogated and translated into a unique code signal (for example, binary-coded decimal signal) by means of an accumulator 11 and a full-adder 12 and then supplied to an input buffer 31 provided in RAM 30. The input buffer 31 is constituted by a portion of a register which is a storage not associated with the arithmetic operations.

With such an arrangement, CPU 10 always interrogates and determines during the arithmetic operation mode whether input information from the keyboard 50 is either present or absent. In the presence of the key input information the arithmetic operation is temporarily halted and at this time interrogation procedure as to the key input information is performed. That is, the input information representative of identity of the depressed key is temporarily stored in the input buffer 31 at this time. Thereafter, CPU 10 initiates again an arithmetic operation on the entered input information in the buffer 31. ROM 20 contains a program unit and its associated address selection circuit.

The input information temporarily stored in the input buffer 31 is loaded into an X register under control of CPU 10 and simultaneously a display unit 60 provides a visual indication of the contents of an X register. If it is desired to print the input information from the keyboard 50 or the operation results from CPU 10, provision of a CPU-controlled printer 70 is needed to do so. It will be noted that CPU 10, ROM 20, RAM 30 and I/O interface 40 are all implemented on a one-chip LSI through the use of the conventional techniques well known in the semiconductor art.

Figure 3:
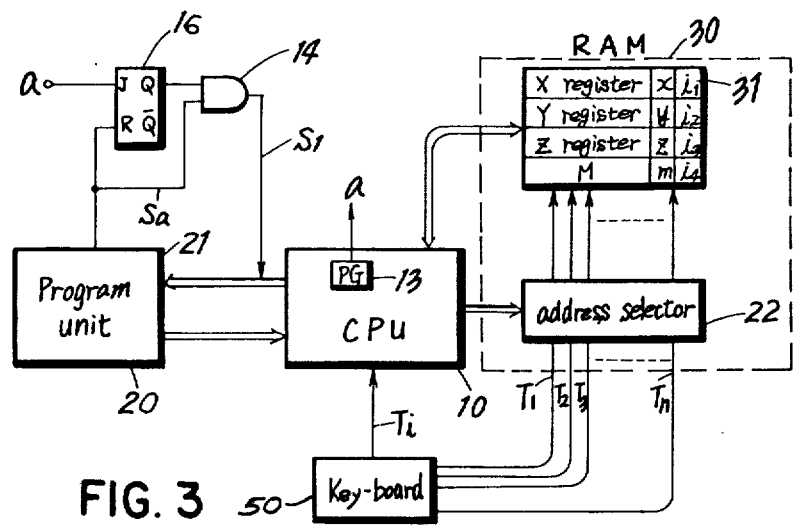
FIG. 3 is a circuit diagram showing one preferred embodiment of the key entry technique of the present invention.

FIG. 3 illustrates a schematic block diagram of one preferred embodiment of the key entry and translation system in accordance with the present invention. In this drawing RAM 30 is illustrated as therefor an address selector 22. Under control of CPU 10, the address selector 22 serves to issue sequentially key stroke signals or time-shared key interrogate signals $T_1-T_n$ during a key entry mode and also serves as an address selector for RAM 30 during an arithmetic operation Mode. The two functions of the address selector 22 are performed on a time-shared basis.

A flip-flop 16 and an AND gate 14 interposed between CPU 10 and the program unit 21 form a circuit for generating key input interrogation instructions $S_1$. Application of a signal a, forces the flip-flop 16 into its set state to issue the instruction $S_1$, and that of a signal Sa forces the same into its reset state thereby inhibiting the issuance of the instruction $S_1$.

Consecutive supply of the signal a set forth above is derived from a pulse oscillator 13 constituted within CPU 10, the period of the signal Sa being chosen longer (about 10 msec.) so that chattering phenomena do not affect the key entry mode. In the case where an output means is connected with a printer, a string of timing signals developed from the printer may be utilized as the signal a.

The other signals Sa for controlling the issuance of the instructions $S_1$ are developed to issue the key interrogation instruction $S_1$ during key-waiting period and in the course of the arithmetic operation mode and printing mode.

When the instruction $S_1$ occurs, the program unit 21 demands key interrogation from CPU 10 and therefore CPU 10 interrupts temporarily an arithmetic operation even in the course of the arithmetic operation mode and then checks whether the input information from the keyboard is either present or absent. In the presence of the key input information, the address selector 22 provides in sequence key stroke signals which in turn are individually supplied to the respective key switches of the keyboard 50. And otherwise, the issuance of the key stroke signals may be dependent upon any shift register.

The accumulator 11 and full-adder 12 interrogate the depressed keys, as they are strobed by the signals from the address selector. The signals received by the interrogation of the respective depressed keys comprise time-shared indentity signals for each of the keys. These time-shared identity signals are coded in binary coded decimal form by the accumulator and adder for application into the input buffer 31 within RAM 30. In this instance the address selector 22 functions as an address assigning circuit for RAM 30. RAM 30 contains various registers X, Y, Z, ..., one or more memories M and decimal point storage stages x, y, z, m, ... in addition to the input buffer 31.

Figure 4:
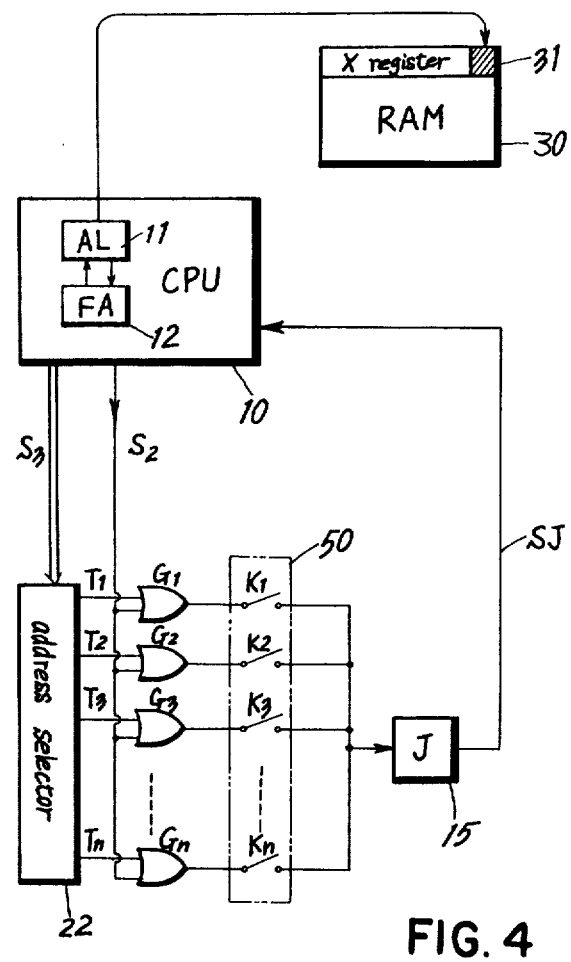
FIG. 4 is a more detailed circuit diagram showing a key interrogate portion shown in FIG. 3.

In FIG. 4 illustrating a detailed circuit diagram of a key interrogate portion of the system shown in FIG. 3 upon the issuance of the key input interrogation instruction $S_1$, CPU 10 develops a test signal $S_2$ ($S_2 \rightarrow$ high-level) which in turn is supplied to OR gates $G_1-G_n$ connected with the respective key switches $K_1-K_n$. When any one of the key-switches $K_1-K_n$ is selected and input information from the keyboard 50 is present, a key input determination flip-flop (J) 15 of D type is set to provide a key input presence signal SJ. If this occurs, the test signal $S_2$ disappears (that is, $S_2 \rightarrow$ low level) under control of CPU 10 and then a key stroke generation signal $S_3$ develops after the chattering phenomena run out. The result is sequential issuance of the key stroke signals $T_1-T_n$ from the address selector 22. Under three circumstances the accumulator 11 within CPU 19 is set to its initial stage conditions (e.g. "00001").

First of all, upon appearance of the first key stroke signal $T_1$, this signal $T_1$ is applied to the key switch $K_1$ (i.e. '0' digit key) of the keyboard 50 through the OR gate $G_1$. In this condition, if the key switch K1 is not manually operated, the key stroke signal $T_1$ will not cause the flip-flop 15 to be placed in the set state nor develop the key input presence signal SJ. When the signal SJ is not sensed in this way after the issuance of the stroke signal $T_1$, addition of '1' is effected on the accumulator 11 in CPU 10 with the result that the contents of the accumulator 11 are modified to '00010'. This is accomplished by the full-adder 12 within CPU 12. The issuance of the key stroke generation signal $S_3$ causes the second key stroke signal $T_2$ to develop from the address selector 22, the second key stroke signal $T_2$ being supplied to the key switch $K_2$ (e.g. 1 digit key). In such way, a string of the key stroke signals $T_1-T_n$ are generated in sequence, and the contents of the accumulator 11 change in a manner to provide a representation of identity of the corresponding key, as a consequence of the repeated addition of 1 on the accumulator 11. When the flip-flop 15 finds depression of a certain key Ki, the key stroke generation signal $S_3$ disappears and the contents of the accumulator 11 are transmitted to the input buffer 31 in RAM 20.

Figure 5:
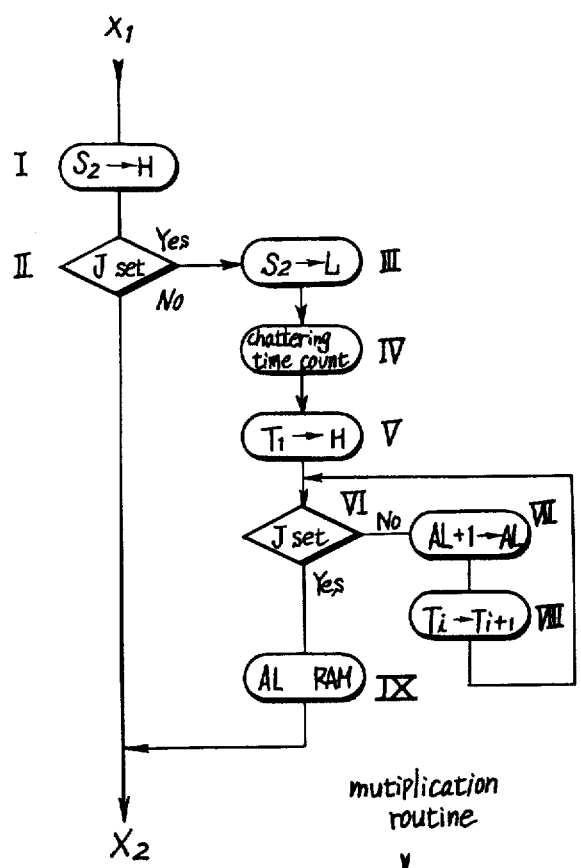
FIGS. 5 and 6 are flow diagrams the sequence of events occuring during entry of data by the present system.

FIG. 5 is a flow diagram showing the key entry mode in accordance with the present invention. During the interrogation period as to the input information from the keyboard, the test signal $S_2$ is first issued (the step I) to determine whether or not the J flip-flop 15 is in the set state (the step II). This confirms the presence and absence of key depression for all of the key switches. In the case where the flip-flop 15 is not in the set state, the absence of the input information from the keyboard causes the next succeeding arithmetic operation or printing operation to go ahead. It is to be noted that the interrogation period initiated by the test signal $S_2$ requires only one bit time and, therefore, is shortended remarkably as compared with the prior art approach.

Afterward, the J flip-flop in the set state prevents the issuance of the test signal $S_2$ (the step III) and, after the chattering phenomena run out in the keyboard (the step IV), the first key stroke signal $T_1$ is developed (the step V, $T_1 \rightarrow$ high level). The determination is performed as to whether the J flip-flop 15 is in the set state (the step VI ) and, if the affirmative answer is not obtained, the addition of 1 is effected on the accumulator 11 (the step VII). Consequently, the next succeeding key stroke signal Ti + $_1$ developed (the step VIII) to initiate again determination as to whether the J flip-flop 15 is in the set state. In the event that the J flop-flop 15 is in the set state, the contents of the accumulator 11 are transmitted as a desired coded signal representative of the identity of the selected key into the input buffer 31 in RAM 20 (the step IX).

The arithmetic operation or printing operation continues again after the entry and translation modes as to the input information from the keyboard are performed. The arithmetic or printing operation is continued and completed under the control of CPU 10. Upon completion of the continued arithmetic operation or printing procedure, it is confirmed whether the information in the input buffer 31 is either present or absent. In the presence of the information the processing procedure and the computing procedure set forth above are effected on the input information from the keyboard.

Figure 6:
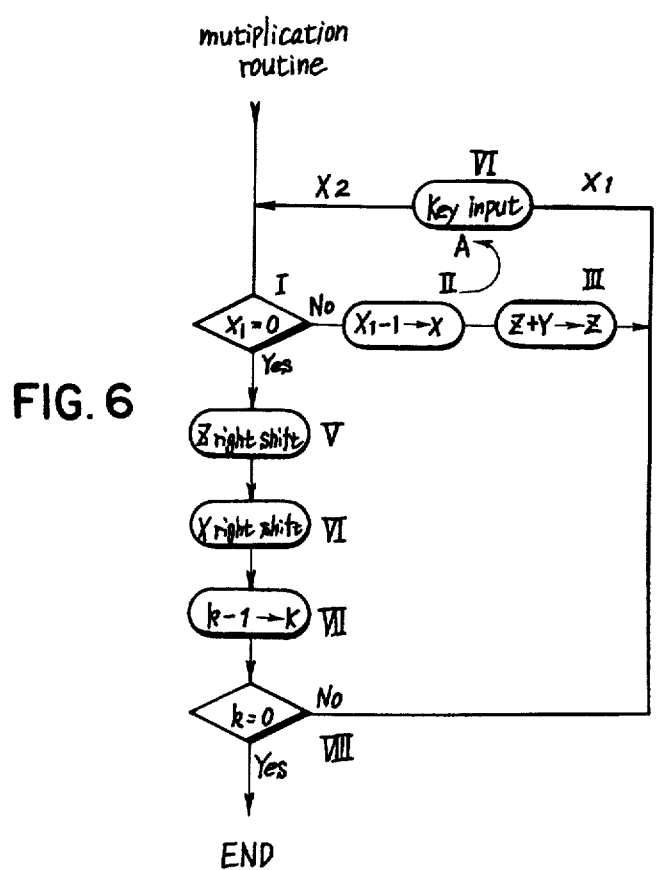

Referring to FIG. 6, there is illustrated the sequence of key input interrogation steps during on arithmetic operation mode (for example, multiplication). This function initiates with determination as to whether the X register bears 0 in the first digit place $X_1$ (the step I). If $X_1 \neq O$, the contents of $X_1$ are subtracted by 1 (the step II) and then the addition is effected on the contents of the Z register and the Y register, the result of the addition being reverted to the Z register (the step III). Such addition routine A will be repeated until $X_1$ reaches 0. In other words, the key entry and translation step is achieved during such addition routine (the step IV). Thereafter, the multiplication routine begins wherein the Z register is first subject to one-digit right shift if $Y_1 = O$ (the step V) and then the X register also is subject to one-digit right shift (the step VI). After subtraction of 1 from the digit number count $k$ (the step VII), determination is performed whether the same reaches 0 (the step VIII). If $k=0$, the multiplication is completed. The present invention may be modified as would occur to one of ordinary skill in the art without departure from the spirit and scope of the invention, and all such modifications are intended to be included within the scope of the following claims.

We claim:

1. A circuit arrangement for introducing as identifying signal characterizing a selected key of a keyboard into an electronic calculator, said keyboard including a plurality of digit entry keys and function entry keys each having first and second terminals, said first terminals of which are commonly connected, wherein said calculator includes a data processor unit (CPU), a random access memory (RAM) and a read only memory (ROM), said data processor unit (CPU) including a pulse generator and a counter means consisting of an adder controlled by said pulse generator and an accumulator means, said random access memory (RAM) having first and second modes of operation including means for storing operand data and an address selector means for generating address signals for said data in a first mode of operation and means for generating time-shared key interrogation signals in a second mode of operation, and said read only memory (ROM) including a program storage means for storing program instructions for controlling the data processor unit, said circuit arrangement comprising:

a. means for coupling said address selector means contained within the random access memory (RAM) with said second terminals of the keyboard so that address signals generated in said second mode by said address selector means are respectively coupled as key strobe time-shared key interrogation signals with the respective second terminals of the keys;
 b. means for applying the key interrogation signals to said counter means contained in said data processor unit by means of a selected key of said keyboard thereby providing a desired code signal constituting a representation of identity of the selected key;
 c. input buffer means contained within said random access memory for storing said code signals representing the identity of a selected key; and
 d. means for applying said code signals generated by said counting means to said input buffer means.

2. The circuit arrangement of claim 1 further including:

means for generating a test signal;
 means for applying the test signal to all of the keys of said keyboard to determine the presence of any input information in the keyboard;
 means for generating a control signal in response to the presence of any input information in said keyboard; and
 means for applying said control signal to said address selector means to cause the application of said time-shared key interrogation signals to said keyboard.

3. The circuit arrangement of claim 2 further including:

timing means for precluding the application of said time-shared key interrogation signals until after the occurrence of any chattering phenomena necessarily caused by key depression.

4. The circuit arrangement of claim 2 further including:

a plurality of OR gates corresponding in number to the number of keys in said keyboard, each of said OR gates having a pair of input terminals and an output terminal;
 means coupling the output terminal of each OR gate to a respective one of said second terminals of said keys;
 means coupling one of said input terminals of each of said OR gates to said address selector means to thereby apply respective key interrogation signals thereto;
 means coupling the other of said input terminals of each of said OR gates in common to said means for generating said test signal; and means connecting said commonly connected first terminals of said keys to said means for generating a control signal.

5. The circuit arrangement of claim 4 further including:
means constraining said test signal to a one-bit time period and wherein said means for generating a control signal comprises a one-bit delay flip-flop.

6. The circuit arrangement of claim 1 wherein said counter means comprises a full-adder means, the full-adder means and accumulator means in combination providing a unique code signal constituting a representation of identity of a selected key switch.

7. The circuit arrangement of claim 1 further including:
means for applying to the input buffer means of said RAM, input information from said keys sensed by said CPU during a first stage of an arithmetic operation instructed by said function entry keys: and
means in said CPU for continuing said instructed arithmetic operation on the contents of said input buffer after completion of said first stage of said arithmetic operation.

8. The circuit arrangement of claim 7 further including:
means for temporarily interrupting said first stage of instructed arithmetic operation in response to the application of key interrogating signals to said keyboard from said address selector means.

* * * * *